United States Patent [19]

Brecker et al.

[11] 4,255,320

[45] Mar. 10, 1981

[54] MIXTURES OF ALKYLTIN SULFIDES AND ALKYLTIN 2-ACYLOXYETHYLMERCAPTIDES AS STABILIZER COMPOSITIONS FOR POLYVINYL CHLORIDE RESIN COMPOSITIONS

[75] Inventors: Lawrence R. Brecker, Brooklyn; Charles Keeley, Wantagh, both of N.Y.

[73] Assignee: Argus Chemical Corporation, Brooklyn, N.Y.

[21] Appl. No.: 913,936

[22] Filed: Jun. 8, 1978

[51] Int. Cl.³ .......................... C08K 5/57; C08K 5/58
[52] U.S. Cl. .................................. 260/45.75; 252/406; 260/28.5 D; 260/45.75 J; 260/45.75 S
[58] Field of Search .................. 260/28.5 D, 45.75 K, 260/45.75 S, 45.75 J, 429.7; 252/400 R, 406

[56] References Cited

U.S. PATENT DOCUMENTS

| | | | |
|---|---|---|---|
| 2,870,119 | 1/1959 | Leistner | 260/45.75 K |
| 2,872,468 | 2/1959 | Leistner | 260/429.7 |
| 3,632,538 | 1/1972 | Kauder | 260/23 X |
| 3,787,357 | 1/1974 | Brecker | 252/406 |
| 4,062,881 | 12/1977 | Kugele | 260/45.75 S |

FOREIGN PATENT DOCUMENTS 759382 10/1956 United Kingdom .

Primary Examiner—Donald E. Czaja
Assistant Examiner—W. Thompson

[57] ABSTRACT

Stabilizer mixtures are provided for rigid polyvinyl chloride resin compositions, capable of enhancing the resistance of the polyvinyl chloride resin to the development of an early discoloration during the first five to twenty minutes of heating at elevated processing temperatures, of the order of 375° F. and higher, comprising a monoalkyltin 2-acyloxyethylmercaptide and/or a dialkyltin 2-acyloxyethylmercaptide inadmixture with an alkyltin sulfide.

26 Claims, No Drawings

MIXTURES OF ALKYLTIN SULFIDES AND ALKYLTIN 2-ACYLOXYETHYLMERCAPTIDES AS STABILIZER COMPOSITIONS FOR POLYVINYL CHLORIDE RESIN COMPOSITIONS

Polyvinyl chloride resin compositions used for the manufacture of rigid articles such as pipe and siding for buildings are processed nowadays by extrusion in multi-screw extruders. Multi-screw extruders differ from the older single-screw extruders, calenders and blow-molding machines in retaining the polyvinyl chloride resin composition being processed for a much shorter period of time. The polyvinyl chloride resin compositions that are being extruded are highly lubricated, by virtue of the addition of substantial amounts of lubricants such as calcium stearate, so that, due to the positive displacement pumping action of the multi-screw extruder, they can be processed at any desired rate. Thus, the polyvinyl chloride resin compositions may not be subjected to the rather elevated temperatures, of the order of 375° F. and higher, required to bring the composition to an extrudable, softened condition for much longer than thirty minutes, and frequently only for as little as five to ten minutes.

Conventional heat stabilizers are not suitable for use with the rigid polyvinyl chloride resin compositions especially formulated for extrusion in such machines. Such stabilizers are formulated to impart long term heat stability, but these compositions do not require stabilization against long heating times at 375° F. What is required, particularly for light colored compositions, is a resistance to the development of significant discoloration during the first five to ten or twenty minutes of heating. Such discoloration is referred to as "early yellowing". Long term heat stabilizers are tailored to inhibit the development of dark discoloration after forty minutes of heating, and more. An early discoloration can be tolerated, since some discoloration is expected, if only the color after long term heating is not much worse, and the degradation in physical properties can be avoided.

Unfortunately, the highly lubricated formulations that have been developed for extrusion in these machines contain substantial quantities of lubricants, such as calcium stearate; frequently, more lubricant than stabilizer. Typically from 0.6 to 1 part per hundred, and sometimes as much as two parts per hundred, of lubricant are used, with from 0.3 to 0.5 part per hundred of an organotin stabilizer containing 12% tin or less. Such proportions are to be contrasted with the proportions used in conventional extrudable compositions for use with single-screw extruders, where from 1 to 1.5 parts per hundred of stabilizers containing 18% tin or 21 to 26% tin is used, with a maximum of about 0.5 part per hundred of the lubricant.

Since the most popular lubricant has been calcium stearate, the change in relative proportions has meant a considerable change in the tin/calcium ratio. Moreover, since calcium stearate has a tendency to impart an initial yellow discoloration on its own, which tends to worsen as heating continues, the prevention of early yellowing in such highly lubricated extrudable formulations has become correspondingly more difficult.

The organotin mercaptocarboxylic acid esters are widely recognized as the most effective organotin stabilizers, having a tin content of about 18% Sn. The position of the organotin mercaptocarboxylic acid esters has been challenged in recent years by the provision of stabilizers containing a higher proportion of tin, from about 21 to about 26% Sn, referred to as the "high efficiency" organotins. The latter are exemplified by the organotin mercaptocarboxylic acid ester sulfides of U.S. Pat. Nos. 3,565,930, 3,565,931, and 3,817,915 (see later discussion). However, a high tin content is not a determinative factor in preventing the development of early discoloration, as exemplified by the organotin sulfides, which offer the highest tin and sulfur content per organotin group, and yet are not the most effective in this respect, affording a poor initial color, particularly.

The organotin mercaptocarboxylic acid esters are described in U.S. Pat. Nos. 3,753,325 to Leistner et al, issued June 26, 1956, U.S. Pat. No. 2,641,596 to Leistner et al, issued June 9, 1953 and U.S. Pat. No. 2,648,650 to Weinberg et al, issued Aug. 11, 1953.

Variations on these have also been proposed, derived from 2-hydroxyethyl and 2-acyloxyethylmercaptans, also referred to as 2-mercaptoethanol and 2-mercaptoethylcarboxylate esters, including Stefl et al U.S. Pat. No. 2,731,440, Best U.S. Pat. No. 2,731,484, Ramsden et al U.S. Pat. No. 2,790,785, Mack et al U.S. Pat. No. 2,809,956, Ramsden et al U.S. Pat. No. 2,830,067, Leistner U.S. Pat. Nos. 2,870,119, 2,870,182, 2,872,468 and 2,883,363, Ramsden U.S. Pat. No. 2,885,415 and British Pat. No. 759,382, Molt U.S. Pat. No. 3,931,263 and German Offenlegungsschrift No. 2,503,554. These have not, however, been found to be as satisfactory as the organotin mercaptocarboxylic acid esters, and none has ever received much attention commercially.

Stefl U.S. Pat. No. 2,731,440 patented Jan. 17, 1956 proposed monoorganotin trimercaptides of the formula:

in which formula:

$R_1$ independently in each occurrence represents an organic radical consisting of from one to twenty-two carbon atoms, hydrogen, carbon-carbon single bonds, carbon-hydrogen bonds, (optionally) aromatic ring carbon-carbon double bonds and (also optionally) a maximum total of four innocuous structures such as carbon-carbon triple bonds, aliphatic carbon-carbon double bonds, ether linkages, thioether linkages, carboxylic ester groups bonded to carbon atoms, fluorine atoms linked to carbon atoms, and halogen atoms bonded to aromatic ring carbon atoms; and $R_2$ independently in each occurrence represents an organic radical consisting of from one to twenty-two carbon atoms, hydrogen, carbon-carbon single bonds, carbon-hydrogen bonds, (optionally) aromatic ring carbon-carbon double bonds, and (also optionally) a maximum total of four innocuous structures such as carbon-carbon triple bonds, aliphatic carbon-carbon double bonds, hydroxyl groups bonded to carbon, sulfhydryl groups bonded to carbon, ether linkages, thioether linkages, carboxylic ester groups bonded to carbon atoms, carboxylic amide groups bonded to carbon atoms, fluorine atoms bonded to carbon atoms, halogen atoms bonded to aromatic ring carbon atoms, and groups of the formula

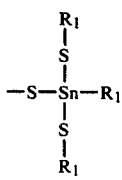 (I-A)

under the same notation.

In the above formulae, the atoms in the groups $R_1$ and $R_2$ attached to the sulfur and tin atoms must always be carbon atoms. It will also be understood that the innocuous groups mentioned as optional constituents of the radicals $R_1$ or $R_2$ need not all be identical in any given radical $R_1$ or $R_2$, but their total number, enumerated without distinction as to kind of innocuous group, must not exceed four in any given radical $R_1$ or $R_2$.

These stabilizers are said to be effective in stabilizing vinyl chloride resins at temperatures of from 315° to 350° F. for extended periods of time, such as thirty to sixty minutes. There is no reference to resistance to the development of early discoloration.

Best U.S. Pat. No. 2,731,484 patented Jan. 17, 1956 proposed diorganotin dimercaptides of the formula:

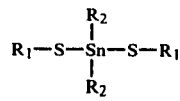 (I)

in which formula $R_1$ independently in each occurrence represents an organic radical consisting of from one to twenty-two carbon atoms, hydrogen, carbon-carbon single bonds, carbon-hydrogen bonds, (optionally) aromatic ring carbon-carbon double bonds, and (also optionally) a maximum total of four innocuous structures such as carbon-carbon triple bonds, aliphatic carbon-carbon double bonds, hydroxyl groups bonded to carbon, sulfhydryl groups bonded to carbon, ether linkages, thioether linkages, carboxylic ester groups bonded to carbon atoms, carboxylic amine groups bonded to carbon atoms, fluorine atoms bonded to carbon atoms, halogen atoms bonded to aromatic ring carbon atoms and groups of the formula:

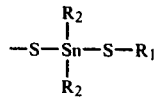 (I-A)

under the same notation, and $R_2$ independently in each occurrence represents and organic radical consisting of from one to twenty-two carbon atoms, carbon, hydrogen, carbon-carbon single bonds, carbon-hydrogen bonds, (optionally) aromatic ring carbon-carbon double bonds and (also optionally) a maximum total of four innocuous structures such as carbon-carbon triple bonds, aliphatic carbon-carbon double bonds, ether linkages, thioether linkages, carboxylic ester groups bonded to carbon atoms, fluorine atoms bonded to carbon atoms, and halogen atoms bonded to aromatic ring carbon atoms.

In the above and all following formulae, the atoms in the groups $R_1$ and $R_2$ attached to the sulfur and tin atoms must always be carbon atoms.

Ramsden, Weinberg and Tomka U.S. Pat. No. 2,790,785 patented Apr. 30, 1957 proposed hydrocarbontin mercapto alcohol esters having the formula:

where

R is an alkyl, aryl, aralkyl group and R' is an alkylene or arylene group, X is a residue of an oxygen-containing acid less an hydroxyl group, and n is an integer in the order of 1, 2 or 3. In these compounds, all valences of Sn not satisfied by R groups are joined to S atoms.

These compounds were proposed as antioxidants for natural and synthetic rubbers.

Mack and Parker U.S. Pat. No. 2,809,956 patented Oct. 15, 1957 proposed organotin compounds in polymeric form of the types:

 (1)

and

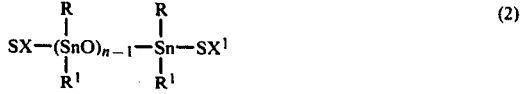 (2)

In these formulae, R and R' are monovalent hydrocarbon radicals. They may be different but will be in most cases identical when the dihydrocarbon tin halides or oxides available in commerce are used as starting materials for the synthesis of the compounds; R and $R^1$ may be aliphatic, aromatic, or alicyclic groups, such as methyl, ethyl, propyl, butyl, amyl, hexyl, octyl, lauryl, allyl, benzyl, phenyl, tolyl, cyclohexyl.

SX and $SX^1$ are radicals of a mercapto compound, which are bound through the S atom to a terminal Sn atom. Suitable mercapto compounds are, for instance, mercaptans, mercapto alcohols, and esters thereof, and esters of mercapto acids.

Ramsden and Weinberg U.S. Pat. No. 2,830,067 patented Apr. 8, 1958 proposed a group of sulfur-containing organostannate stabilizers which are the reaction product of an alcohol or alcohols, a dibasic acid, a bifunctional tin oxide, and a mercaptoalkanol derivative. At least a portion of the organotin or all of the organotin is present as a "six-fold coordinate organostannate anion" of the type:

wherein

R=alkyl, aryl or aralkyl, Y=coordination groups, coordinated through O or S, and b is a varying charge dependent upon the nature of the Y's.

Leistner and Hecker U.S. Pat. Nos. 2,870,119 and 2,870,182 both patented Jan. 20, 1959 proposed organotin mercapto alcohol monocarboxylic acid esters of the type:

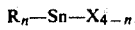

wherein

R stands for a radical selected from the group consisting of alkyl, aryl, oxyalkyl and oxyaryl, the furfuryl and tetrahydrofurfuryl radicals, X for the radical of an ester of a mercapto alcohol having from two to four carbon atoms, and having its sulfur atom linked to Sn, and n for an integral number from 1 to 3.

The mercaptoalcohol can be esterified with an aliphatic acid or cycloaliphatic acid having from six to twelve carbon atoms. Exemplary products are:

(1) $C_4H_9Sn(S\ CH_2CH_2OCOC_{11}H_{23})_3$
(2) $(C_4H_9)_2Sn(S\ CH_2CH_2OCOC_{11}H_{23})_2$
(3) $(C_4H_9)_3Sn\ S\ CH_2CH_2OCOC_{11}H_{23}$

Leistner and Hecker U.S. Pat. Nos. 2,872,468 patented Feb. 3, 1959 and 2,883,363 patented Apr. 21, 1959 proposed organotin compounds of the type:

wherein

R stands for a radical selected from the group consisting of alkyl, aryl, hydroaromatic or heterocyclic radicals, X for the radical of an ester of a mercapto alcohol having from two to four carbon atoms with an aliphatic aromatic or hydroaromatic dibasic acid containing from six to twelve carbon atoms, and n for an integral number from 1 to 3.

In this case, the alcohol can be esterified with a dicarboxylic acid, producing products having the type formulae:

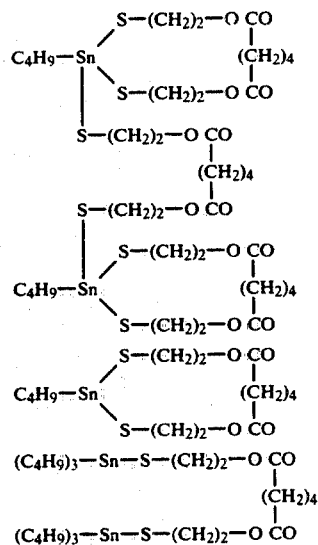

Ramsden U.S. Pat. No. 2,885,415 patented May 5, 1969 suggested organotin compounds derived from mercaptoalcohols in which each mercaptyl hydrogen is replaced by a bond to an organotin group, the hydroxyl hydrogen either remaining intact or also being replaced by bonds to the same or other organotin groups. These compounds are defined by the formula:

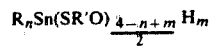

wherein n is 1, 2 or 3; R is a radical selected from the group consisting of alkyl, alkenyl, alkynyl, aryl and aralkyl groups; R' is selected from the group consisting of aliphatic and aromatic radicals, and m is a number from 0 to 4−n. R' may be derived from any mercaptoalcohol wherein the mercapto group is not inactivated by molecular configuration, such as beta-mercaptoethanol; 3-mercaptopropanol-1; 2-mercaptopropanol-1; 1-mercaptopropanol-2; 2 (or 3 or 4) mercapto-n-butanol-1; o-(or m- or p-) mercaptobenzyl alcohol; etc.

Dorfelt and Lorz U.S. Pat. No. 3,442,852 patented May 6, 1969 proposed organotin stabilizers obtained by reacting an organotin halide having one hydrocarbon group with a mixture of an alkali metal sulfide and an aliphatic alkali metal mercaptide, or an alkali metal salt of a saturated or unsaturated mono or polycarboxylic acid. The products are complex mixtures composed of one or more of the following materials:

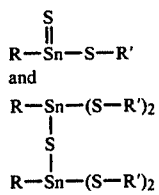

Products with three and more tin atoms linked by sulfur bridges may also form, for example, compounds of the formula:

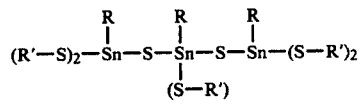

In the above formula R means the hydrocarbon radical which is directly bound to the tin atom via a carbon atom and R' is the alkyl radical of the mercaptan. Analogous compounds in which —S—R' of the above formulae is replaced by —O—CO—R' are obtained by reacting alkyltin halide, alkali metal sulfide and alkali metal salts of carboxylic acids.

Molt U.S. Pat. No. 3,931,263 patented Jan. 6, 1976 proposed a new method of preparing organotin mercaptides based on the reaction of organotin sulfides with active organic halides in the presence of water. A complex series of reactions is described as follows:

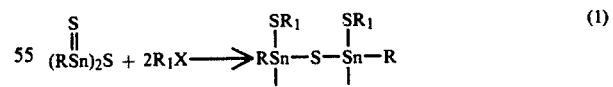

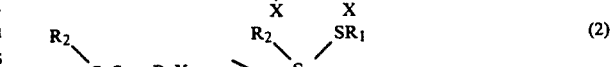

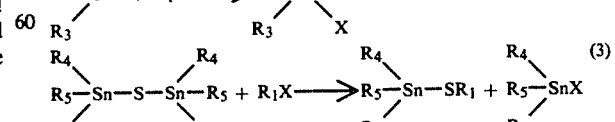

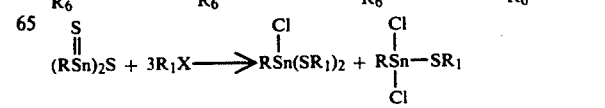

-continued

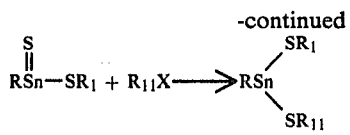

wherein:

$R_1$, $R_2$, $R_3$, $R_4$, $R_5$, and $R_6$ are alkyl, usually of one to twenty carbon atoms, cycloalkyl, usually of five to six carbon atoms in the ring, alkenyl, usually of two to twenty or more, frequently three to eighteen carbon atoms, aryl, usually phenyl or alkyl phenyl having one to four carbon atoms in the alkyl group, or aralkyl, usually of seven carbon atoms ($R_1$, $R_2$, $R_3$, $R_4$, $R_5$, and $R_6$ preferably are methyl);

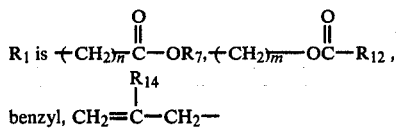

where $R_{14}$ is hydrogen or methyl;
$R_{11}$ is defined as $R_1$;
$R_7$ is alkyl usually of one to twenty carbon atoms, cycloalkyl usually having five to six carbon atoms in the ring, alkenyl, usually of two to twenty carbon atoms, more commonly three to eighteen carbon atoms, or aralkyl, usually of seven carbon atoms:
$R_{12}$ is alkyl, usually of one to nineteen carbon atoms, or alkenyl usually of two to seventeen carbon atoms;
X is a halogen of atomic weight 35 to 80, i.e., chlorine or bromine;
n is an integer of 1 or 2; and
m is an integer of 2 to 3.

Molt acknowledges that many of the products prepared by this process are old. Thus, Leistner U.S. Pat. No. 2,641,596 discloses some of the nonchlorine-containing compounds prepared by reaction (3). Brecker U.S. Pat. No. 3,595,931 shows many compounds which can be prepared from the compounds made by reaction (1). Hoye U.S. Pat. No. 3,542,825 discloses many compounds prepared by reactions (2) and (4) as does the similar British Pat. No. 1,117,652. Wowk U.S. Pat. No. 3,665,025 and British Pat. No. 1,297,550 disclose some of the compounds prepared by reaction (4) as well as compounds somewhat similar to those prepared in reaction (1).

German Offenlegungsschrift No. 2,503,554 published Sept. 11, 1975 describes the preparation of various methyltin thioethers including methyltin thioglycolates and thioglycolate sulfides.

British Pat. No. 759,382 published Oct. 17, 1956 describes condensation products of hydrocarbontin compounds with mercapto alcohol esters, defined by the formula:

wherein
n is 1, 2 or 3;
R is an alkyl, alkenyl, alkynyl, aryl or aralkyl radical;
$R^1$ is an alkylene or arylene radical, and $R^{11}$ is an acyl group.

All the valences of Sn not satisfied by R groups are joined to S atoms.

The organotin sulfides are described in U.S. Pat. No. 2,746,946 to Weinberg et al, dated May 22, 1956. Polymeric organotin sulfides having a high proportion of tin and sulfur by weight have also been suggested. Examples of such materials are given in U.S. Pat. No. 3,021,302 to Frey, dated Feb. 13, 1962, which discloses polymeric condensation products of hydrocarbon stannonic acid, hydrocarbon thiostannonic acid and co-condensation products of these materials. However, all of these materials have suffered from one or another failing, which until now has prevented their coming into general commercial use.

Dutch Pat. No. 6700014, published July 4, 1967, and referring to U.S. applications Ser. Nos. 517,967 filed Jan. 3, 1966, and 531,805 filed Mar. 2, 1966, describes combinations of monoalkyltin sulfides with trisubstituted hindered phenols, and optionally, in addition, with organotin mercapto carboxylic acids, mercapto carboxylic acid esters, or mercaptides. The purpose of the addition of the phenol is evidently to avoid the deleterious properties of the organotin sulfide, and the further addition of the organotin mercaptide, mercapto acid or mercapto acid ester supplements the effect of the phenol and of the organotin sulfide in this regard.

Similar disclosures of polymeric organotin compounds, which generally include a chain of tin atoms connected through oxygen or sulfur atoms, are set out in U.S. Pats. No. 2,597,920, dated Apr. 15, 1962; No. 2,626,953, dated Jan. 27, 1953; No. 2,628,211, dated Feb. 10, 1953; No. 2,746,946, dated May 22, 1956; No. 3,184,430, dated May 18, 1965; and No. 2,938,013, dated May 24, 1960.

U.S. Pat. Nos. 3,078,390, 3,196,129 and 3,217,004 describe a series of thioacetal and thioketal organotin carboxylate salt stabilizers which can be prepared in situ by the reaction of thioacetal and thioketal carboxylic acids with dihydrocarbontin oxides or sulfides, or the corresponding monohydrocarbon or trihydrocarbontin compounds.

U.S. Pat. Nos. 3,565,930 and 3,565,931, both patented Feb. 23, 1971, and No. 3,817,915, patented June 18, 1974, have suggested that the organotin mercaptocarboxylic acid esters are the recognized standard for judging other organotin stabilizers, and considered that the way to improve upon these stabilizers was to increase the amount of tin and sulfur in the molecule. Accordingly, organotin mercaptocarboxylic acid ester sulfides were proposed, having a relatively high concentration of tin, within the range from about 18 to about 35% tin, and from about 10 to about 25% sulfur.

These organotin mercapto acid ester sulfides are defined as organotin compounds having organic radicals linked to tin only through carbon, mercapto sulfur, and sulfide sulfur groups, and have the general formula:

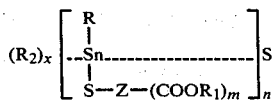

n is an integer from one to two.
m is the number of $COOR_1$ groups, and is an integer from one to four.
x is an integer from zero to one.

R is a hydrocarbon radical having from about one to about eighteen carbon atoms, and preferably from four to eight carbon atoms.

$R_1$ is an organic group derived from a monohydric or polyhydric alcohol of the formula $R(OH)_{n4}$, where $n_4$ is an integer from one to about four, but is preferably one or two.

$R_2$ is R or S A $(COOR_1)_m$.

Z is a bivalent alkylene radical carrying the S group in a position alpha or beta to a $COOR_1$ group, and can contain additional free carboxylic acid, carboxylic ester, or carboxylic acid salt groups, and mercapto groups. The Z radical has from one to about five carbon atoms.

Kauder, U.S. Pat. No. 3,632,538, patented Jan. 4, 1972, provides particularly effective polyvinyl chloride resin stabilizer compositions having a relatively high concentration of tin, within the range from about 20 to about 35% Sn, and a relatively high concentration of sulfur, within the range from about 10 to about 25% S, and comprising (a) an organotin α- or β-mercapto carboxylic acid ester, and (b) an organotin sulfide.

The organotin sulfides contain groups linked to tin only through carbon, and a sulfide sulfur group, =S, wherein the sulfide sulfur valences are linked to the same tin atom or to different tin atoms. Each compound contains per tin atom one or two hydrocarbon or heterocyclic groups linked to tin through carbon. For best results, Kauder states, and to obtain a synergistic stabilizing effectiveness, at least one of the compounds of the combination of this invention should contain only one hydrocarbon group per tin atom, linked to tin through a carbon atom. This combination generally improves the initial color of a resin composition during heating, i.e., during the first thirty minutes of a heat test, and can also improve the long-term stability before final charring.

It has also been suggested that combinations of monoalkyltin and dialkyltin mercapto compounds are superior to the mono- or the dialkyltin mercapto compounds alone. Weisfeld U.S. Pat. Nos. 3,640,950 and 3,925,309 and Brecker U.S. Pat. No. 3,787,357 disclose various combinations of this type, but they are not however as effective in inhibiting the development of an early discoloration during the first fifteen minutes of heating.

Kugele, U.S. Pat. No. 4,062,881, patented Dec. 13, 1977, provides monoorganotin and/or diorganotin mercaptoalkyl carboxylate monosulfides and/or poly sulfides useful as stabilizers for improving the resistance to deterioration of vinyl chloride polymers (e.g., vinyl chloride resins) when heated at 350° F. having at least two tin atoms linked together only through sulfide sulfur and having tin atoms linked to said tin atoms one to two hydrocarbon groups (e.g., alkyl, aryl, cycloalkyl, aralkyl or alkenyl having from one to twenty carbon atoms), and linked to the tin through carbon, at least one mercaptoalkyl carboxylic acid ester group linked to tin through the sulfur of the mercaptoalkyl group, the organotin compound having an amount of tin within the range from 10 to 42% by weight and an amount of sulfur within the range from 8 to 42% by weight.

The compounds are said to have the formula:

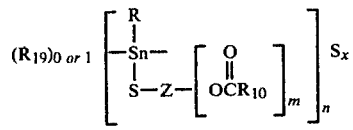

where
R is hydrocarbyl, e.g., alkyl, aryl, cycloalkyl, aralkyl or alkenyl and R usually has one to twenty carbon atoms, $R_{19}$ is R or

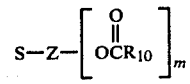

where
Z is a polyvalent alkylene or hydroxyalkylene radical of at least two carbon atoms and usually not over twenty carbon atoms, the valence of Z being m+1, $R_{10}$ is hydrogen, alkyl, aryl, aralkyl, cycloalkyl, aralkenyl, alkenyl having up to 3 ethylenic double bonds, hydroxy-alkyl, hydroxy-alkenyl or $-R_{14}COOR_{23}$, where $R_{14}$ is $(CH_2)_p$, phenylene or $-CH=CH-$ where p is 0 or an integer up to 8 and $R_{23}$ is alkyl of one to twenty carbon atoms, cycloalkyl of five to six carbon atoms, alkenyl of two to twenty carbon atoms, aryl, e.g., phenyl or tolyl or benzyl. $R_{10}$ can have one to nineteen carbon atoms or more when it is a hydrocarbon or hydroxy-hydrocarbon group, m is the number of $OOCR_{10}$ groups, m is an integer of 1 to 3, n is an integer of 1 to 2 and x is 1 to 10, usually 1 to 4.

In addition to these compounds, there can also be employed overbased tin compounds by reacting a compound of the formula:

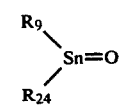

where
$R_{24}$ is defined as $R_9$ in an amount of up to 2 moles per available carboxyl group with such tin sulfides. The "overbased" product can be obtained simply by dissolving the dihydrocarbyltin oxide in the tin mercaptoalkyl carboxylic acid ester sulfide, for example.

In preparing these compounds, numerous processes can be employed. The reaction can be carried out at room temperature to 100° C., usually at 25° to 50° C. The reaction is usually carried out with water as a solvent, regardless of the procedure employed. There can also be employed water-immiscible organic solvents, e.g., aliphatic and aromatic hydrocarbons, e.g., hexane, octane, benzene, toluene, xylene, aliphatic carboxylic acid esters, e.g., butyl acetate, propyl propionate, methyl valerate. The proportions of solvent are not critical and can vary widely.

Illustrative procedures include:

PROCEDURE 1

This follows the general procedure of Kauder and Brecker, Pat. Nos. 3,565,930 and 3,565,931, except that sodium monosulfide, sodium disulfide, sodium trisulfide, sodium tetrasulfide, ammonium monosulfide, ammonium disulfide, ammonium trisulfide or ammonium tetrasulfide is reacted with the appropriate tin compound and appropriate —SH containing compound or compounds as indicated above, for example.

PROCEDURE 2

In this procedure, the sodium mono or polysulfide (or potassium mono or polysulfide), water, mercapto containing ester, hydrocarbon if desired and ammonium hydroxide are charged into a reactor and an aqueous solution of an alkyltin halide slowly added, e.g., at 25° to 35° C. The mixture is then heated, e.g., to 50° C., the layers separated, and the product is washed and dried.

PROCEDURE 3

In this method the mercapto containing ester, water, organic solvent and ammonium hydroxide are charged into a flask and then two solutions (A) alkyltin chloride and (B) alkali metal mono or polysulfide are added simultaneously. The product is then separated, washed and stripped.

PROCEDURE 4

This is the same procedure as Procedure 3 except that $NaHCO_3$ is substituted in the same molar amount for the ammonium hydroxide.

PROCEDURE 5

In this procedure the alkyltin chloride, water and ammonium hydroxide are charged into a flask and then there are added simultaneously the mercapto containing ester and alkali metal mono or polysulfide.

PROCEDURE 6

This method comprises charging the mercapto containing ester, water and ammonium hydroxide into a reactor and then adding an alkyltin chloride followed by an alkali metal polysulfide or monosulfide slowly at 30° C. After heating to 45° C., the product was separated, washed and stripped.

In accordance with this invention, stabilizer mixtures for extrudable rigid polyvinyl chloride resin compositions are provided, composed of a mixture of a monoalkyltin 2-acyloxyethylmercaptide, of a dialkyltin 2-acyloxyethylmercaptide, or both, with a dialkyltin and-/or monoalkyltin sulfide. These stabilizer mixtures are remarkably effective in inhibiting the development of early discoloration when the composition is heated at 375° F. during the first five or ten minutes up to approximately twenty or even thirty minutes of heating, even in the presence of substantial proportions of lubricating metal carboxylate salts, such as calcium stearate. This effect is particularly remarkable in view of the fact that such lubricants and particularly calcium stearate impart a yellow discoloration initially to the resin composition, even before heating is begun. In the presence of the stabilizer systems of the invention, however, this initial yellow discoloration does not appear, and the development of such discoloration is inhibited for at least the first ten to twenty minutes of heating.

The monoalkyltin 2-acyloxyethylmercaptides are defined by the formula:

  1.

The dialkyltin 2-acyloxyethylmercaptides are defined by the formula:

  11.

In these formulae $R_1$ is an aliphatic hydrocarbon group having from one to about twenty-six carbon atoms in a straight or branched chain.

$R_4$ is H or

not more than one $R_4$ being H.

$R_2$ and $R_3$ are a hydrogen atom or an aliphatic hydrocarbon group which can be either saturated or ethylenically unsaturated, and has from about one to about twenty carbon atoms. It is apparent from formulae I and II that the esterifying carboxylic acid in the 2-acyloxyethylmercaptide group has an unsubstituted or monosubstituted α-carbon, and branching can occur in the $R_2$ group. Aliphatic acids having two substituents on the α-carbon and aromatic acids do not readily esterify the alcohol hydroxyl of the 2-mercaptoethanol groups —$SCH_2CH_2O$—.

If a mixture of monoalkyltin and dialkyltin 2-acyloxyethylmercaptides is used, the relative proportions thereof are important to stabilizing effectiveness. This proportion is expressed as tin content of the total tin present in the mixture. From about 30 to about 90%, and preferably from about 45 to about 75%, of the total tin should be monoalkyltin 2-acyloxyethylmercaptide, while the remainder, from about 10 to about 70%, and preferably from about 25 to about 55%, of the total tin is dialkyltin 2-acyloxyethylmercaptide.

The monoalkyltin and dialkyltin 2-acyloxyethylmercaptides are known compounds, and can be prepared using known procedures. From the standpoint of ease of preparation, it is convenient if $R_1$ and $R_2$ are the same in monoalkyltin and dialkyltin 2-acyloxyethylmercaptides, since in this event, mixtures of the monoalkyltin trihalide and dialkyltin dihalide, such as $RSnCl_3$ and $R_2SnCl_2$, the intermediates used in the preparation of the stabilizer, can easily be made in a single reaction step, either from stannic tetrachloride and excess dimethyltin dichloride to give monomethyltin trichloride and dimethyltin dichloride, or from tetraalkyltin $R_2Sn$ (where R is an alkyl higher than methyl) to give monoalkyltin trichloride mixed with dialkyltin dichloride.

The alkyltin sulfides useful in combination with these organotin 2-acyloxyethylmercaptides contain one or two alkyl groups linked to tin through carbon, and a sulfide sulfur group, =S, wherein the sulfide sulfur valences are linked to the same tin atom or to different tin atoms. Each compound contains per tin atom one or two hydrocarbon groups linked to tin through carbon.

One type of dialkyltin sulfides useful in this invention can be defined by the formula:

  111 wherein

R is an alkyl group linked to tin through carbon, and containing from one to about eight carbon atoms. The atomic ratio of sulfur to tin is 1:1.

Another group of organotin sulfides of this invention are polymers which can be illustrated by the formulae:

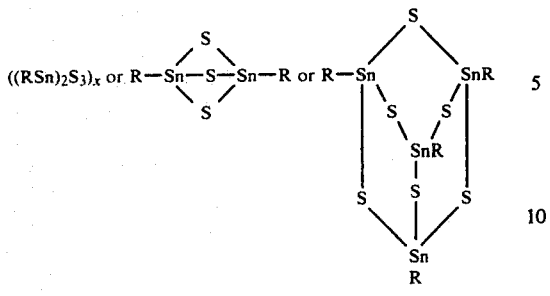

in which

R is alkyl as above and each tin atom is linked to three sulfur atoms and each sulfur is linked to two tin atoms, and x is a number from one to about 100.

Another type has the recurring group

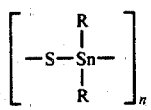

where n is the number of units in the chain, and ranges up to 100 and more.

Another way of defining the $R_2SnS$ type is:

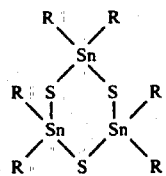

The R's are as defined above. The above formulae are not intended to limit the structure of the compound in any way. The structures can be straight chain, branched chain, cyclic, or any combination thereof.

The R alkyl groups in the above formulae have from one to eight carbon atoms. The preferred R groups are alkyl groups having from four to eight carbon atoms.

These organotin sulfides are well known and can be prepared by a number of procedures described in earlier references which are known to the art. For example, hydrogen sulfide can be bubbled at about 40° C. into a slurry of hydrocarbontin oxide in water or an organic solvent (such as methanol, acetone, or toluene). The insoluble oxide is converted to a solution or dispersion of the sulfide and the reaction is terminated when the entire system is liquefied.

Another useful technique is the displacement of hydrocarbontin halide (e.g. $Bu_2SCl_2$) by an aqueous alkali metal sulfide or ammonium sulfide. Hydrocarbontin sulfides also can be prepared from the interaction of hydrocarbontin halide with other sulfur compounds than sulfides, such as sodium thiosulfite and ammonium polysulfide. These reactions provide unstable intermediates that decompose to the hydrocarbontin sulfide plus another product characteristic of the particular starting materials, e.g. alkali metal sulfide or free sulfur.

All the above preparative methods can be summarized in the transformations below, where the n-butyltin compounds shown are representative of the entire class of organotin compounds:

$(Bu_2SnO)_m + mH_2S \rightarrow m/n\ (Bu_2SnS)_n + mH_2O$ $Bu_2SnCl_2 + Na_2S \rightarrow 1/n\ (Bu_2SnS)_n + NaCl$ $2BuSnCl_3 + 3Na_2S \rightarrow 1/x\ ((BuSn)_2S_3)_x + 6NaCl$ $Bu_2SnCl_2 + Na_2S_2O_3 + NaOH \rightarrow 1/n\ (Bu_2SnS)_n + 2NaCl + NaHSO_3$ $Bu_2SnCl_3 + (NH_4)_2S_4 \rightarrow 1/n\ (BuSnS)_n + 2NH_4Cl + 2S$ When these preparations are carried out in an aqueous medium, a small proportion of the sulfur atoms in the hydrocarbontin sulfides are replaced by oxygen atoms, resulting in sulfur-deficient products having average compositions represented by the empirical formulae:

$(R_2SnS_pO_{1-p})$ and $((RSn)_2S_rO_{2-r})_x$, where p is at least 0.85 and r is at least 1.5.

In the stabilizer composition of this invention these sulfides are fully as effective as the pure oxygen-free sulfides, and wherever alkyltin sulfides are mentioned the term is intended to include both the pure compounds and the sulfur-deficient preparations.

There are many other procedures for the preparation of these compounds. The above list of procedures is not intended to be exhaustive. Alkyltin sulfides prepared by any other procedure would also be useful in the present combination.

The R alkyl groups linked to tin through carbon can, for example, be methyl, ethyl, propyl, isopropyl, n-butyl, isobutyl, tert-butyl, sec-butyl, amyl, hexyl, octyl, 2-ethylhexyl and isooctyl.

Preferred examples of organotin sulfides are dipropyltin sulfide, dibutyltin sulfide, di-n-pentyltin sulfide, dihexyltin sulfide, di-2-ethylhexyltin sulfide, di-(isobutyl)tin sulfide, di-(octyltin)sulfide, dimethyltin sulfide, di-(isoamyl)tin sulfide, diisohexyltin sulfide, and 2-ethyl butyltin sulfide; butyltin sesquisulfide $((BuSn)_2S_3)_x$ (x=from 1 to 100 or higher), hexyltin sesquisulfide, isooctyltin sesquisulfide, heptyltin sesquisulfide, n-octyltin sesquisulfide, sec-butyltin sesquisulfide, propyltin sesquisulfide, isoamyltin sesquisulfide, and 2-ethylhexyltin sesquisulfide.

The above compounds can have any degree of polymerization falling within the above formula.

Components of these stabilizer compositions can be selected so as to have a relatively high concentration of tin, up to about 35% Sn, and a relatively high concentration of sulfur, up to about 25% S. Since these stabilizer compositions are remarkably effective in low concentrations, i.e., working with modest quantities of tin and sulfur relative to vinyl chloride polymer being stabilized, it is also possible to formulate stabilizer compositions having modest tin and sulfur concentrations as low as about 6% tin and 4% sulfur by selection of active components and inert diluents where necessary.

The following mixtures of alkyltin 2-acyloxyethylmercaptides and alkyltin sulfides are typical of those coming within the invention:

| | Alkyltin 2-acyloxyethylmercaptide | Dialkyltin Sulfide |
|---|---|---|
| 1. | iso-$C_4H_9$—Sn$+$SCH$_2$CH$_2$—OOCC$_2$H$_5$]$_3$ | (n-$C_4H_9$)$_2$SnS |
| 2. | [iso-$C_4H_9$]$_2$—Sn—[SCH$_2$CH$_2$OOCC$_2$H$_5$]$_2$ | (n-$C_4H_9$)$_2$SnS |
| 3. | n-$C_6H_{13}$—Sn$+$SCH$_2$CH$_2$—OOCC$_4$H$_9$]$_3$ | (n-$C_4H_9$)$_2$SnS |
| 4. | [n-$C_6H_{13}$]$_2$—Sn—[SCH$_2$CH$_2$—OOCC$_4$H$_9$]$_2$ | (n-$C_4H_9$)$_2$SnS |
| 5. | n-$C_3H_7$—Sn$+$S—CH$_2$CH$_2$OOCCH$_2$CH$_2$—O—CH$_2$CH$_2$OH]$_3$ | (n-$C_4H_9$)$_2$SnS |
| 6. | [n-$C_3H_7$]$_2$—Sn—[S—CH$_2$CH$_2$OOCCH$_2$CH$_2$—O—CH$_2$CH$_2$OH]$_2$ | (n-$C_4H_9$)$_2$SnS |
| 7. | n-$C_5H_{11}$—Sn—[SCH$_2$CH$_2$OOCC$_5$H$_{11}$]$_3$ | (n-$C_4H_9$)$_2$SnS |
| 8. | [n-$C_5H_{11}$]$_2$—Sn—[SCH$_2$CH$_2$OOCC$_5$H$_{11}$]$_2$ | (n-$C_4H_9$)$_2$SnS |
| 9. | CH$_3$Sn$+$SCH$_2$CH$_2$OOCC$_2$H$_5$]$_3$ | (n-$C_4H_9$)$_2$SnS |
| 10. | [CH$_3$]$_2$—Sn—[S—CH$_2$CH$_2$OOCC$_2$H$_5$]$_2$ | (n-$C_4H_9$)$_2$SnS |
| 11. | iso-$C_3H_7$—Sn(—SCH$_2$CH$_2$OOCC$_6$H$_{13}$)(—SCH$_2$CH$_2$OOCC$_6$H$_{13}$)(—SCH$_2$CH$_2$OH) | (n-$C_4H_9$)$_2$SnS |
| 12. | [iso-$C_3H_7$]$_2$—Sn—[—S—CH$_2$CH$_2$OOCCH$_2$—C(CH$_3$)$_2$—CH$_2$OH]$_2$ | (n-$C_4H_9$)$_2$SnS |
| 13. | CH$_3$—CH(CH$_3$)—CH$_2$—Sn$+$S—CH$_2$CH$_2$—OOC—CH$_3$]$_3$ | (n-$C_4H_9$)$_2$SnS |
| 14. | [CH$_3$—CH(CH$_3$)—CH$_2$]$_2$—Sn—[S—CH$_2$CH$_2$—OOC—CH(C$_2$H$_5$)CH$_2$CH$_3$]$_2$ | (n-$C_4H_9$)$_2$SnS |
| 15. | iso-$C_8H_{17}$—Sn$+$S—CH$_2$CH$_2$OOCCH$_2$CH(OH)—CH$_2$OH]$_3$ | (n-$C_4H_9$)$_2$SnS |
| 16. | [iso-$C_8H_{17}$]$_2$—Sn—[S—CH$_2$CH$_2$OOCCH$_2$CH(OH)—CH$_2$OH]$_2$ | (n-$C_4H_9$)$_2$SnS |
| 17. | $C_8H_{17}$—Sn$+$S—CH$_2$CH$_2$OOC$_2$H$_5$]$_3$ | (n-$C_4H_9$)$_2$SnS |
| 18. | [$C_8H_{17}$]$_2$—Sn—[S—CH$_2$CH$_2$OOC$_2$H$_5$]$_2$ | (n-$C_4H_9$)$_2$SnS |
| 19. | iso-$C_8H_{17}$OOCCH$_2$—Sn$+$SCH$_2$CH$_2$COOC$_8$H$_{17}$-iso]$_3$ | (n-$C_4H_9$)$_2$SnS |
| 20. | [iso-$C_8H_{17}$OOCCH$_2$]$_2$—Sn—[SCH$_2$CH$_2$OOCC$_8$H$_{17}$-iso]$_2$ | (n-$C_4H_9$)$_2$SnS |
| 21. | [$C_{18}H_{37}$]$_2$—Sn—[S—CH$_2$—CH$_2$—OOC—CH$_2$CH$_3$]$_2$ | (n-$C_4H_9$)$_2$SnS |
| 22. | $C_{18}H_{37}$—Sn$+$S—CH$_2$—CH$_2$—OOC—CH$_2$CH$_3$]$_3$ | (n-$C_4H_9$)$_2$SnS |
| 23. | [$C_{12}H_{25}$]$_2$—Sn—[S—CH$_2$—CH$_2$—OOC—(CH$_2$)$_2$OH]$_2$ | (n-$C_4H_9$)$_2$SnS |
| 24. | $C_{12}H_{25}$—Sn$+$S—CH$_2$—CH$_2$—OOC—(CH$_2$)$_2$OH]$_3$ | (n-$C_4H_9$)$_2$SnS |
| 25. | $C_8H_{17}$—Sn$+$SCH$_2$CH$_2$OOCC$_8$H$_{17}$]$_3$ | (n-$C_4H_9$)$_2$SnS |
| 26. | [$C_8H_{17}$]$_2$—Sn—[SCH$_2$CH$_2$OOCC$_8$H$_{17}$]$_2$ | (n-$C_4H_9$)$_2$SnS |
| 27. | $C_4H_9$—Sn$+$SCH$_2$CH$_2$OOCC$_4$H$_9$]$_3$ | (n-$C_4H_9$)$_2$SnS |
| 28. | [$C_4H_9$]$_2$—Sn—[SCH$_2$CH$_2$OOCC$_4$H$_9$]$_2$ | (n-$C_4H_9$)$_2$SnS |
| 29. | CH$_3$—Sn$+$SCH$_2$CH$_2$OOCC$_8$H$_{17}$]$_3$ | (n-$C_4H_9$)$_2$SnS |
| 30. | [CH$_3$]$_2$—Sn—[SCH$_2$CH$_2$OOCC$_8$H$_{17}$]$_2$ | (n-$C_4H_9$)$_2$SnS |

In place of di n-butyl tin sulfide in the above combinations, any of the following can be substituted:
di-n-octyltin sulfide
dimethyltin sulfide
di-2-ethylhexyltin sulfide
di-isobutyltin sulfide
di-n-dodecyltin sulfide The following mixtures of alkyltin 2-acyloxyethylmercaptides and alkyltin sulfides are typical of those coming within the invention:

| | Alkyltin 2-acyloxyethylmercaptide | Monoalkyltin sesquisulfide |
|---|---|---|
| 31. | iso-$C_4H_9$—Sn$+$SCH$_2$CH$_2$—OOCC$_2$H$_5$]$_3$ | (n-$C_4H_9$)$_2$Sn$_2$S$_3$ |
| 32. | [iso-$C_4H_9$]$_2$—Sn—[SCH$_2$CH$_2$OOCC$_2$H$_5$]$_2$ | (n-$C_4H_9$)$_2$Sn$_2$S$_3$ |
| 33. | n-$C_6H_{13}$—Sn$+$SCH$_2$CH$_2$—OOCC$_4$H$_9$]$_3$ | (n-$C_4H_9$)$_2$Sn$_2$S$_3$ |
| 34. | [n-$C_6H_{13}$]$_2$—Sn—[SCH$_2$CH$_2$—OOCC$_4$H$_9$]$_2$ | (n-$C_4H_9$)$_2$Sn$_2$S$_3$ |
| 35. | n-$C_3H_7$—Sn$+$S—CH$_2$CH$_2$OOCCH$_2$CH$_2$—O—CH$_2$CH$_2$OH]$_3$ | (n-$C_4H_9$)$_2$Sn$_2$S$_3$ |
| 36. | [n-$C_3H_7$]$_2$—Sn—[S—CH$_2$CH$_2$OOCCH$_2$CH$_2$—O—CH$_2$CH$_2$OH]$_2$ | (n-$C_4H_9$)$_2$Sn$_2$S$_3$ |
| 37. | n-$C_5H_{11}$—Sn$+$SCH$_2$CH$_2$OOCC$_5$H$_{11}$]$_3$ | (n-$C_4H_9$)$_2$Sn$_2$S$_3$ |
| 38. | [n-$C_5H_{11}$]$_2$—Sn—[SCH$_2$CH$_2$OOCC$_5$H$_{11}$]$_2$ | (n-$C_4H_9$)$_2$Sn$_2$S$_3$ |
| 39. | CH$_3$Sn$+$SCH$_2$CH$_2$OOCC$_2$H$_5$]$_3$ | (n-$C_4H_9$)$_2$Sn$_2$S$_3$ |
| 40. | [CH$_3$]$_2$—Sn—[S—CH$_2$CH$_2$OOCC$_2$H$_5$]$_2$ | (n-$C_4H_9$)$_2$Sn$_2$S$_3$ |
| 41. | iso-$C_3H_7$—Sn(—SCH$_2$CH$_2$OOCC$_6$H$_{13}$)(—SCH$_2$CH$_2$OOCC$_6$H$_{13}$)(—SCH$_2$CH$_2$OH) | (n-$C_4H_9$)$_2$Sn$_2$S$_3$ |
| 42. | [iso-$C_3H_7$]$_2$—Sn—[—S—CH$_2$CH$_2$OOCCH$_2$—C(CH$_3$)$_2$—CH$_2$OH]$_2$ | (n-$C_4H_9$)$_2$Sn$_2$S$_3$ |

-continued

| | Alkyltin 2-acyloxyethylmercaptide | Monoalkyltin sesquisulfide |
|---|---|---|
| 43. | $CH_3-CH-CH_2-Sn+S-CH_2CH_2-OOC-CH_3]_3$<br>       $\vert$<br>      $CH_3$ | $(n-C_4H_9)_2Sn_2S_3$ |
| 44. |                                 $C_2H_5$<br>                                  $\vert$<br>$[CH_3-CH-CH_2]_2-Sn-[S-CH_2CH_2-OOC-CHCH_2CH_3]_2$<br>       $\vert$<br>      $CH_3$ | $(n-C_4H_9)_2Sn_2S_3$ |
| 45. | iso-$C_8H_{17}-Sn-[S-CH_2CH_2OOCCH_2CH-CH_2OH]_3$<br>                                                        $\vert$<br>                                                      OH | $(n-C_4H_9Sn)_2S_3$ |
| 46. | $[iso-C_8H_{17}]_2-Sn-[S-CH_2CH_2OOCCH_2CH-CH_2OH]_2$<br>                                                     $\vert$<br>                                                 OH | $(n-C_4H_9Sn)_2S_3$ |
| 47. | $C_8H_{17}-Sn+S-CH_2CH_2OOC_2H_5]_3$ | $(n-C_4H_9Sn)_2S_3$ |
| 48. | $[C_8H_{17}]_2-Sn-[S-CH_2CH_2OOC_2H_5]_2$ | $(n-C_4H_9Sn)_2S_3$ |
| 49. | iso-$C_8H_{17}OOCCH_2-Sn+SCH_2CH_2COOC_8H_{17}$-iso]$_3$ | $(n-C_4H_9Sn)_2S_3$ |
| 50. | $[iso-C_8H_{17}OOCCH_2]_2-Sn-[SCH_2CH_2OOCC_8H_{17}$-iso]$_2$ | $(n-C_4H_9Sn)_2S_3$ |
| 51. | $[C_{18}H_{37}]_2-Sn-[S-CH_2-CH_2-OOC-CH_2CH_3]_2$ | $(n-C_4H_9Sn)_2S_3$ |
| 52. | $C_{18}H_{37}-Sn+S-CH_2-CH_2-OOC-CH_2CH_3]_3$ | $(n-C_4H_9Sn)_2S_3$ |
| 53. | $[C_{12}H_{25}]_2-Sn-[S-CH_2-CH_2-OOC-(CH_2)_2OH]_2$ | $(n-C_4H_9Sn)_2S_3$ |
| 54. | $C_{12}H_{25}-Sn+S-CH_2-CH_2-OOC-(CH_2)_2OH]_3$ | $(n-C_4H_9Sn)_2S_3$ |
| 55. | $C_8H_{17}-Sn+SCH_2CH_2OOCC_8H_{17}]_3$ | $(n-C_4H_9Sn)_2S_3$ |
| 56. | $[C_8H_{17}]_2-Sn-[SCH_2CH_2OOCC_8H_{17}]_2$ | $(n-C_4H_9Sn)_2S_3$ |
| 57. | $C_4H_9-Sn+SCH_2CH_2OOCC_4H_9]_3$ | $(n-C_4H_9Sn)_2S_3$ |
| 58. | $[C_4H_9]_2-Sn-[SCH_2CH_2OOCC_4H_9]_2$ | $(n-C_4H_9Sn)_2S_3$ |
| 59. | $CH_3-Sn+SCH_2CH_2OOCC_8H_{17}]_3$ | $(n-C_4H_9Sn)_2S_3$ |
| 60. | $[CH_3]_2-Sn-[SCH_2CH_2OOCC_8H_{17}]_2$ | $(n-C_4H_9Sn)_2S_3$ |

In place of n-butyl tin sesquisulfide in the above combinations, any of the following can be substituted:
n-octyltin sesquisulfide
methyltin sesquisulfide
2-ethylhexyltin sesquisulfide
isobutyltin sesquisulfide
n-dodecyltin sesquisulfide The compositions of the invention have been found by infrared spectral analysis and by refractive indices to be simple mixtures and not reaction products, whether they are prepared by simple mixing of the alkyltin sulfide and alkyltin 2-acyloxyethylmercaptide, or by formation of these components in situ and at the same time.

Infrared spectra of the alkyltin sulfide and alkyltin 2-acyloxyethylmercaptide, after they have been mixed together, and after they have been formed in situ together, as in the reaction procedure illustrated in Examples A to W, are identical, with no displacement beyond experimental error of $\pm 10$ cm$^{-1}$ of any wavelength peak from its place in the spectrum of the respective alkyltin sulfide or alkyltin 2-acyloxethylmercaptide, taken separately. The refractive indices of the mixtures represent true averages, without displacement of the respective indices, taken separately, of the alkyltin sulfide and alkyltin 2-acyloxyethylmercaptide components. The results given in Example X are typical.

Moreover, the components evidence no tendency to react even on long storage and at elevated temperatures. Accordingly, these mixtures can be prepared either by simple mixing of the alkyltin sulfide and alkyltin 2-acyloxyethylmercaptide, or by formation of these components in situ from their respective starting materials.

The following Examples in the opinion of the inventors represent preferred embodiments of the preparation of mixtures of alkyltin sulfides and alkyltin 2-acyloxyethylmercaptides in accordance with the invention:

EXAMPLE A

Into a 1 liter three-necked flask 212.1 g (0.7 mol) of tall oil fatty acid, 60.1 g (0.77 mol, 10% excess) of 2-mercaptoethanol, 4.1 g (1.5% based on the reactants) of p-toluene sulphonic acid, and 309 ml of benzene were weighed in and refluxed for one hour at 74° to 76° C. Then, a Dean Stark tube was inserted, and water from the reaction azeotroped off over approximately three hours. The product, a solution of 2-mercaptoethyl tallate, was assayed as 44.4%, close to theoretical.

From this ester solution, a mixture of alkyltin sulfide and alkyltin 2-acyloxyethylmercaptide according to this invention was prepared as follows:

Into a 1 liter three-necked flask were placed 204.4 g (0.25 mol) of the 2-mercaptoethyl tallate solution, and 54.6 g of a 2:1 molar mixture of monooctyltin and dioctyltin chlorides. The mixture was then heated with stirring to 40° C. When the temperature reached 40° C., the heat was removed, and the addition of 100 g (pH 6, 0.25 mol, 10% aqueous solution) of sodium hydroxide begun. The temperature was held at between 50° and 60° C. through the heat of the reaction. After all of the caustic had been added, a 20% solution of sodium sulfide was added (48.8 g, 0.075 mol) keeping the temperature between 50° and 60° C. The pH was 6 at the end of the addition. The mixture was stirred for an additional fifteen minutes. The organic layer was then removed to a 500 ml three-necked flask, and vacuum-stripped to a maximum 75° C. at 20 ml Hg. The mixture was then cooled at 50° C., the vacuum lifted, and 0.5% Super-Cel added, after which the mixture was filtered. The product was a mixture of monooctyltin sulfide, monooctyltin tris-(2-tallate oxyethylmercaptide) and dioctyltin bis-(2-tallate oxyethylmercaptide).

For use as a control, a product without alkyltin sulfide but containing monooctyltin and dioctyltin compounds in the same proportions as above was prepared as follows:

Into a 1 liter three-necked flask were placed 327 g (0.4 mol) of the above 2-mercaptoethyl tallate solution and 54.6 g of a 2:1 molar mixture of monooctyltin and dioctyltin chlorides. The mixture was heated with stirring to 40° C., the heat source removed, and the addition of 160 g (0.4 mol) of 10% aqueous sodium hydroxide begun. The temperature was held between 50° and 60° C. through the heat of the reaction. The pH was 6 at the end of the reaction. The mixture was stirred for an additional 15 minutes and allowed to separate. The organic layer was isolated, and vacuum-stripped and filtered as above, yielding a mixture of monooctyltin and dioctyltin 2-mercaptoethyl tallates.

EXAMPLE B

There was charged to a 500 ml three-necked flask, 196 g (0.3 mol) of 2-mercaptoethyl tallate (SH value 5.05) in solution in 2000 ml of benzene, and 52.9 g of a 2:1 molar mixture of monobutyltin trichloride (0.12 mol) and dibutyltin dichloride (0.06 mol). The mixture was stirred at 45° C. and then 120 g of a 10% aqueous sodium hydroxide solution added dropwise, holding the temperature at 50° to 60° C. Then, 58.5 g of a 20% aqueous solution of sodium sulfide was added to pH 6. The mixture was stirred an additional fifteen minutes and then allowed to separate. The organic layer was removed to a 300 ml three-necked flask and vacuum stripped at 70° C., at 25 mm Hg. The product was cooled to 60%, the vacuum lifted, and 0.5% Super-Cel added. The product was then filtered. The product was a mixture of monobutyltin and dibutyltin 2-mercaptoethyl tallates and monobutyltin sulfide.

For use as a control, a product without the butyltin sulfides but containing monobutyltin and dibutyltin 2-mercaptoethyl tallates in the same proportions as above was prepared from 52.9 g of a 2:1 molar mixture of monobutyltin trichloride (0.12 mol) and dibutyltin (0.06 mol) with 313.6 g of the above 2-mercaptoethyl tallate in solution in 3000 ml of benzene and 196 g (0.48 mol) of 10% aqueous sodium hydroxide solution added dropwise while controlling the temperature at 50° to 60° C. The final pH was 6 and the resulting mixture of monobutyltin and dibutyltin acyloxyethyl mercaptides was isolated, stripped and filtered as described above.

EXAMPLE C

A mixture of monomethyltin and dimethyltin 2-acyloxyethylmercaptides from tall oil fatty acid with monomethyltin and/or dimethyltin sulfide, and a control without the methyltin sulfides having the same ratio of monomethyltin to dimethyltin compounds, were prepared by a procedure similar to those of Examples A and B, from the following starting materials:

| Starting Material | Example C | Control |
|---|---|---|
| 2-Mercaptoethyl tallate (434 g = 1 equivalent SH) | 80.5 g (0.15 M) | 128.8 g (0.24 M) |
| Methyltin trichloride | 16.7 g (0.06 M) | 16.7 g (0.06 M) |
| Dimethyltin dichloride | 5.7 g (0.03 M) | 5.7 g (0.03 M) |
| Sodium hydroxide 10% aqueous solution | 60 g (0.15 M) | 96 g (0.24 M) |
| Sodium sulfide (flake 60 to 62% Na₂S) | 5.9 g (0.045 M) | None |

EXAMPLE D

A mixture of monomethyltin and dimethyltin 2-acyloxyethylmercaptides (from mono-n-butyl succinate) with monomethyltin and/or dimethyltin sulfide, and a control without the methyltin sulfides having the same ratio of monomethyltin to dimethyltin compounds, were prepared by a procedure similar to those of Examples A, B, and C, from the following materials:

| Material | Example D | Control |
|---|---|---|
| 2-mercaptoethyl n-butyl succinate (87.7% of calculated SH assay) | 0.3 mol | 0.48 mol |
| Monomethyltin trichloride | 0.12 mol | 0.12 mol |
| Dimethyltin dichloride | 0.06 mol | 0.06 mol |
| Sodium hydroxide (20% aqueous solution) | 0.3 mol | 0.48 mol |
| Sodium sulfide (flake) | 0.09 mol | None |

EXAMPLE E

Monomethyltin tris-(2-acyloxyethylmercaptide) from tall oil fatty acid was blended with dimethyltin sulfide in various proportions to give three different mixtures. The mixtures were stirred fifteen minutes at 60° to 70° C., and filtered, to give clear solutions.

| Mixture | Parts by Weight | | |
|---|---|---|---|
| | 1 | 2 | 3 |
| Monomethyltin tris-(2-acyloxyethylmercaptide) | 108 | 102 | 96 |
| Dimethyltin sulfide | 12 | 18 | 24 |

From these mixtures four stabilizer blends were prepared at the same total tin content. Each blend was combined with butylated hydroxy toluene antioxidant and varying amounts of inert diluent (mineral oil), to a 12% total tin content. For the control, the monomethyltin tris-(2-acyloxyethylmercaptide) was adjusted to 12% tin by addition of butylated hydroxy toluene.

| Blend | Parts by Weight | | | |
|---|---|---|---|---|
| | I | II | III | Control |
| Mixture 1 | 30.8 | — | — | — |
| Mixture 2 | — | 26.4 | — | — |
| Mixture 3 | — | — | 22.4 | — |
| Butylated hydroxy toluene | 2 | 2 | 2 | 5 |
| Mineral oil | 7.2 | 11.6 | 15.6 | — |
| Monomethyltin tris (2-acyloxyethylmercaptide) | — | — | — | 95 |
| TOTAL | 40 | 40 | 40 | 100 |

EXAMPLE F

Monomethyltin tris-(2-acyloxyethylmercaptide) from tall oil fatty acid was blended with dibutyltin sulfide in various proportions. (The components were mixed at ambient temperature (22° C.) and gave clear solutions after very brief stirring). A uniform amount of butylated hydroxy toluene antioxidant and varying amounts of mineral oil diluent were added to each blend to have a uniform total tin content (12% Sn) in each blend.

| Blend | Parts by Weight | | | |
|---|---|---|---|---|
| | I | II | III | Control |
| Dibutyltin sulfide | 11.1 | 14.3 | 16.2 | — |
| Monomethyltin tris (2-acyloxyethylmercaptide) | 69.3 | 56.1 | 44.8 | 95 |
| Butylated hydroxy toluene | 5 | 5 | 5 | 5 |

| Blend | Parts by Weight | | | |
|---|---|---|---|---|
| | I | II | III | Control |
| Mineral oil | 14.6 | 24.6 | 34 | — |
| TOTAL | 100 | 100 | 100 | 100 |

EXAMPLES I to W

Following the procedure of Examples A and B, various stabilizer mixtures according to the invention were prepared from the ingredients shown in the following Table A. All parts are by weight.

TABLE A

| Ingredient | I | J | K | L | M | N | O | P | Q | R | S | T | U | V | W |
|---|---|---|---|---|---|---|---|---|---|---|---|---|---|---|---|
| 2-Nonanoyloxyethylmercaptan | 75 | — | — | 289.7 | 289.2 | — | — | — | — | — | — | — | — | — | — |
| 2-Acytoxyethylmercaotan from mixed n-octanoic and n-decanoic acids | — | 468 | — | — | — | — | — | — | — | — | — | — | — | — | — |
| 2-(2-Ethylhexanoyloxy)ethylmercaptan | — | — | — | — | — | — | — | 225 | — | — | — | — | — | — | — |
| 2-(3,5,5-Trimethylhexanoyloxy)ethylmercaptan | — | — | 297 | — | — | — | — | — | — | — | — | — | — | — | — |
| 2-Propionyloxyethylmercaptan | — | — | — | — | — | 132 | — | — | — | — | — | — | — | — | — |
| 2-Acetoxyethylmercaptan | — | — | — | — | — | 120 | — | — | — | — | — | — | — | — | — |
| 2-Oleyoxyethylmercaptan | — | — | — | — | — | — | — | — | — | — | — | 308.6 | — | — | — |
| 2-Hydroxyethylmercaptan | — | — | — | — | — | — | — | — | — | 219.4 | — | — | — | — | — |
| 2-Acyloxyethylmercaptan (from tall oil fatty acid) | — | — | — | — | — | — | — | — | — | 219.4 | 180.1 | — | — | — | — |
| 2-Acyloxyethylmercaptan (from mixed n-dodecanoic and n-tetradecanoic acids) | — | — | — | — | — | — | — | — | 171 | — | — | — | 141.4 | 238.3 | 277.9 |
| Methyltin trichloride | — | 209 | — | — | 120 | — | — | — | 63.2 | 601 | 59.9 | 58.0 | — | 96.4 | 96.4 |
| Dimethyltin dichloride | — | 101 | — | — | 54.9 | — | — | — | 51.8 | 293 | — | 32.7 | — | 15.4 | 15.4 |
| n-Butyltin trichloride | — | — | 141.1 | 141.1 | — | 112.9 | 112.9 | 112.9 | — | — | — | — | 84.6 | — | — |
| Dibutyltin dichloride | — | — | 75.9 | 75.9 | — | 60.7 | 60.7 | 60.7 | — | — | — | — | 9.4 | — | — |
| n-Octyltin trichloride | 46.5 | — | — | — | — | — | — | — | — | — | — | — | — | — | — |
| Di-n-octyltin dichloride | 27.5 | — | — | — | — | — | — | — | — | — | — | — | — | — | — |
| Sodium hydroxide | 13.5 | 84.7 | 50 | 50 | 50 | 40 | 40 | 40 | 31.3 | 250 | 20.0 | 25.0 | 24.1 | 40.6 | 49.2 |
| Sodium sulfide (flake 60–62%) | 13 | 83.6 | 49 | 49 | 49 | 39 | 39 | 39 | 32.5 | 244 | 16.2 | 31.7 | 23.4 | 22.0 | 11.1 |

EXAMPLE G

Monomethyltin tris-(2-acyloxyethylmercaptide) from tall oil fatty acid was mixed with dimethyltin and monomethyltin sulfides in various proportions to give four different mixtures. The mixtures were stirred fifteen minutes at 60° to 70° C., and filtered, to give clear solutions.

| Mixture | Parts by Weight | | | |
|---|---|---|---|---|
| | 1 | 2 | 3 | 4 |
| Monomethyltin tris (2-acyloxyethylmercaptide) | 180 | 180 | 180 | 180 |
| Dimethyltin sulfide | 3 | 11.5 | 14.3 | 15.75 |
| Monomethyltin sulfide | 17 | 8.5 | 5.7 | 4.25 |
| TOTAL | 200 | 200 | 200 | 200 |

EXAMPLE H

Monomethyltin tris-(2-nonanoyloxyethylmercaptide) was blended with dimethyltin and monomethyltin sulfides, butylated hydroxy toluene and mineral oil in various proportions. The mixtures were stirred fifteen minutes at 60° to 70° C., and filtered, to give clear solutions.

| Blend | Parts by Weight | |
|---|---|---|
| | I | II |
| Monomethyltin tris (2-nonanoyloxyethylmercaptide) | 31.4 | 31.4 |
| Dimethyltin sulfide | 3.4 | 1.7 |
| Monomethyltin sulfide | — | 1.7 |
| Butylated hydroxy toluene | 2.9 | 2.9 |
| Mineral oil | 20.3 | 20.3 |
| TOTAL | 58.0 | 58.0 |

EXAMPLE X

A stabilizer mixture of methyltin tris-(2-dodecanoyloxyethyl) mercaptide and dibutyltin sulfide was prepared from 2-dodecanoyloxyethylmercaptan 795.2 g to which were added, in sequence, methyltintrichloride 245 g, sodium hydroxide 122 g, dissolved in one liter of water, dibutyltin dichloride 80.3 g, and sodium sulfide (60% flake) 34.3 g, dissolved in 135 cc water. The reaction was allowed to proceed at 60° C. for four hours. The reaction mixture was worked up by separating the organotin layer from the brine layer, vacuum drying to 85° C. at 15 mm, and filtering. A 974 g yield was obtained (theoretical yield 1000 g). This was designated Mixture 1.

Another stabilizer mixture was prepared by mixing together 930 g methyltin tris-(2-dodecanoyloxyethyl) mercaptide and 70 g dibutyltin sulfide. The two components mixed readily at 25° C., and gave a homogeneous solution, with no heat effect, cloudiness, or gassing. This was designated Mixture 2.

Refractive index measurements and infrared absorption spectra were carried out on Mixtures 1 and 2, and the resulting data, shown in Table B, confirms that the mixtures are identical. Accordingly, the data confirm that Mixture 1 is a mixture of the two components of Mixture 2, and not a reaction product.

TABLE B

| | Methyltin tris 2-dodecanoyloxy ethylmercaptide | Dibutyltin Sulfide | Mixture 1 | Mixture 2 |
|---|---|---|---|---|
| Refractive Index 25° C. | 1.5025 | 1.5707 | 1.5073[1] | 1.5070[1] |
| Infrared absorption cm$^{-1}$ | 3460 m | 3460 w | 3460 w | 3460 w |
| | 3370 m | 2950 s | 3370 m | 3370 m |
| | 2950 sh | 2910 s | 2950 sh | 2950 sh |
| | 2910 s | 2850 sh | 2910 s | 2910 s |

TABLE B-continued

| Methyltin tris 2-dodecanoyloxy ethylmercaptide | Dibutyltin Sulfide | Mixture 1 | Mixture 2 |
|---|---|---|---|
| 2850 s | 2820 s | 2840 s | 2850 s |
| 2400 w | 2700 w | 2400 w | 2400 w |
| 1730 s | 2530 w | 1730 s | 1730 s |
| 1720 s | 2390 w | 1710 m | 1710 m |
| 1710 s | 1850 m | 1580 w | 1580 w |
| 1690 sh | 1710 s | 1540 w | 1540 w |
| 1580 w | 1490 w | 1460 s | 1460 s |
| 1560 w | 1460 sh | 1450 s | 1450 s |
| 1540 w | 1450 s | 1450 s | 1450 s |
| 1460 s | 1410 m | 1410 sh | 1410 sh |
| 1390 sh | 1370 s | 1390 sh | 1390 sh |
| 1370 m | 1340 m | 1370 s | 1370 s |
| 1340 w | 1290 s | 1340 sh | 1340 sh |
| 1300 w | 1250 m | 1280 m | 1280 m |
| 1280 w | 1220 m | 1240 sh | 1240 sh |
| 1250 sh | 1180 m | 1170 sh | 1170 sh |
| 1180 sh | 1170 s | 1150 s | 1150 s |
| 1160 s | 1150 m | 1110 m | 1110 m |
| 1110 m | 1060 s | 1060 m | 1060 m |
| 1050 m | 960 s | 1000 m | 1000 m |
| 1000 m | 880 sh | 870 w | 870 w |
| 860 w | 870 s | 860 w | 860 w |
| 770 m | 840 w | 770 sh | 770 sh |
| 720 m | 770 m | 760 m | 760 m |
| 670 m | 740 m | 720 m | 720 m |
|  | 700 s | 700 s | 700 s |
|  | 690 sh | 670 w | 670 w |
|  | 670 m |  |  |

[1]Refractive index calculated for Mixtures 1 and 2 by linear interpolation of the components is 1.5073.
s = strong
m = medium
w = weak
sh = shoulder The mixtures of alkyltin and/or dialkyltin 2-acyloxyethylmercaptides and alkyltin sulfides of the invention can be used as stabilizers with any polyvinyl chloride resin. The term "polyvinyl chloride" as used herein is inclusive of any polymer formed at least in part of the recurring group:

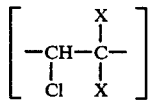

and having a chlorine content in excess of 49%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chloride, such as those disclosed in British Pat. No. 893,288, and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major proportion with other synthetic resins such as chlorinated polyethylene or a copolymer of acrylonitrile, butadiene and styrene. Among the polyvinyl chlorides which can be stabilized are the uniaxially-stretch oriented polyvinyl chlorides described in U.S. Pat. No. 2,934,593 to Isaksem et al., that is, syndiotactic polyvinyl chloride, as well as atactic and isotactic polyvinyl chlorides.

The mixtures of monoalkyltin and/or dialkyltin 2-acyloxyethylmercaptides and alkyltin sulfides of this invention, both with and without supplementary stabilizers, are excellent stabilizers for unplasticized or rigid polyvinyl chloride resins. A plasticizer is used, if at all, in an amount below 10%. When plasticizers are to be employed, they may be incorporated into the polyvinyl chloride resins in accordance with conventional means. The conventional plasticizers can be used, such as dioctyl phthalate, dioctyl sebacate and tricresyl phosphate. Where a plasticizer is employed, it can be used in an amount within the range from 0 to 10 parts by weight of the resin.

Particularly useful plasticizers are the epoxy higher fatty acid esters having from about twenty to about one hundred fifty carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the expoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized linseed oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 1.5%, of a parting agent or lubricant, can also be included. Typical parting agents are the higher aliphatic acids, and alkali and alkaline earth metal salts of such acids, having twelve to twenty-four carbon atoms, such as stearic acid, lauric acid, palmitic acid and myristic acid, lithium stearate, calcium stearate and calcium palmitate, mineral lubricating oils, polyvinyl stearate, polyethylene and paraffin wax.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate-butadiene graft copolymers.

The mixtures of monoalkyltin and/or dialkyltin 2-acyloxyethylmercaptides and alkyltin sulfides of the invention are employed in an amount sufficient to impart the desired resistance to early discoloration during the period from the first five to ten up to about twenty to thirty minutes of heating at working temperatures of 375° F. and above. The more rigorous the conditions to which the resin will be subjected during working and mixing, the greater will be the amount required. Generally, as little as 0.1% total of the stabilizer by weight of the resin will improve resistance to heat deterioration. There is no critical upper limit on the amount, but amounts above about 5% by weight of the resin do not give an increase in stabilizing effectiveness commensurate with the additional stabilizer employed. Preferably, the amount is from about 0.2 to about 2% by weight of the resin.

The stabilizer of the invention is extremely effective when used alone, but it can be employed together with other polyvinyl chloride resin stabilizers, but not other organotin compounds, if special effects are desired. The stabilizer of the invention in this event will be the major stabilizer, and the additional stabilizer will supplement the stabilizing action of the former, the amount of the alkyltin stabilizer being within the range from about 0.25 to about 10 parts by weight per 100 parts of the resin, and the additional stabilizer being in the amount of from about 0.05 to about 10 parts per 100 parts of the resin.

Among the additional metallic stabilizers are included polyvalent metal salts of medium and of high molecular weight fatty acids and phenols, with metals such as calcium, tin, barium, zinc, magnesium, and strontium. The nonmetallic stabilizers include phosphites, epoxy compounds, phenolic antioxidants, polyhydric alcohols, and the like. Epoxy compounds are especially useful and typical compounds are described in U.S. Pat. No. 2,997,454.

The stabilizers of this invention can be formulated for marketing by mixing the alkyltin 2-acyloxyethylmercaptide and alkyltin sulfide as such or with an inert diluent or with any liquid lubricant or plasticizer in suitable concentrations ready to be added to the resin composition to give an appropriate stabilizer and lubricant or plasticizer concentration in the resin. When one of the components is a solid, as for example monobutyltin sulfide or dimethyltin sulfide, mild heating can be used to assist the formation of a uniform mixture or solution. Conveniently, the separate preparation and isolation of a solid alkyltin sulfide can be avoided by preparing the sulfide component from the alkyltin chloride and alkali sulfide reactants in the presence of the alkyltin 2-acyloxyethylmercaptide component to dissolve the sulfide as it is formed. Another useful technique is to prepare both components in one sequence of operations whereby an alkyltin 2-acyloxyethylmercaptide is prepared from a 2-acyloxyethylmercaptan and alkyltin oxide (or alkyltin chloride and a compound acting as acid acceptor, for example, sodium hydroxide) and immediately used without isolation as a vehicle for the preparation of alkyltin sulfide. Other stabilizers and stabilizer adjuncts can be incorporated as well.

The preparation of the polyvinyl chloride resin composition is easily accomplished by conventional procedures. The selected stabilizer combination is formed as described above, and then is blended with the polyvinyl chloride resin, or alternatively, the components are blended individually in the resin, using, for instance, a two or three roll mill, at a temperature at which the mix is fluid and thorough blending facilitated, milling the resin composition including any plasticizer at from 250° to 375° F. for a time sufficient to form a homogeneous mass, five minutes, usually. After the mass is uniform, it is then extruded in the usual way.

For the commercial processing of rigid polyvinyl chloride, the stabilizer is conveniently mixed with all or a portion of the polymer to be stabilized with vigorous agitation under such conditions of time and temperature that the stabilizer is sufficiently imbibed by the polymer to produce a dry, free-flowing powder. The well-known Henschel mixer is well suited to this procedure.

The following Examples in the opinion of the inventor represent preferred embodiments of polyvinyl cloride resin compositions incorporating the mixtures of monoalkyltin and/or dialkyltin 2-acyloxyethylmercaptides and alkyltin sulfides in accordance with the invention as stabilizers therefor.

EXAMPLE 1

Polyvinyl chloride resin homopolymer compositions were prepared by hand mixing into the powdered resin the quantities of powdered or liquid materials shown in Table I below, fluxing the mixture for three minutes at 170° C. on a two-roll mill, and removing the sheets so formed. The formulation tested is representative of multi-screw extrusion formulations in containing a relatively high level of calcium stearate, while for the sake of closer observation of color differences, pigment, filler, and wax are omitted.

Strips cut from each sheet were examined for color appearance as milled at successive five minute intervals, after heating for up to twenty minutes in an air-circulating oven at 190° C.

TABLE I

| | Parts by Weight | | | | | | |
|---|---|---|---|---|---|---|---|
| | Control | | | | | | Example |
| Ingredient | A | B | C | D | E | F | 1 |
| Polyvinyl chloride (homopolymer) | 100 | 100 | 100 | 100 | 100 | 100 | 100 |
| Calcium stearate | 1 | 1 | 1 | 1 | 1 | 1 | 1 |
| Polyacrylic acid resin (processing aid) | 1 | 1 | 1 | 1 | 1 | 1 | 1 |
| Methyltin tris-(2-acyl oxyethyl)mercaptide (from tall oil fatty acid) | None | None | 0.3 | 0.4 | 0.6 | 0.8 | 0.2 |
| Dimethyltin sulfide | None | 0.3 | None | None | None | None | 0.1 |

The color appearance of the samples thereof as-milled and after oven aging at 190° C. are shown in Table II:

TABLE II

| | Color | | | | | | |
|---|---|---|---|---|---|---|---|
| Initial color as-milled | Pink | Light yellow | Light cream | Light cream | Cream | Cream | Hazy white |

TABLE II-continued

| After minutes at 190° C. | Color | | | | | | |
|---|---|---|---|---|---|---|---|
| 5 | Light purple | Yellow | Light yellow | Light yellow | Light yellow | Light yellow | Hazy white |
| 10 | Purple | Yellow | Yellow | Light yellow | Light yellow | Light yellow | Cream |
| 15 | Purple | Yellow | Light amber | Yellow | Light yellow | Light yellow | Cream |
| 20 | Brown | Yellow | Amber | Light amber | Light yellow | Light yellow | Light yellow |

The results shown in Table II are remarkable in several respects.

First, all controls are already discolored to at least a light cream as-milled, while Example 1 is a pure white. The presence of the insoluble calcium stearate prevents see-through clarity, but does not interfere with excellent color retention.

Second, all controls are further changed in color in the first five minutes of heating at 190° C., while Example 1 is unchanged from the fine as-milled condition.

Third, after fifteen minutes of heating Example 1 is less discolored than any of the Controls after five minutes of heating. Finally, only Control A, entirely lacking in alkyltin compound, suffered drastic degradation to a deep color in the test period, thus demonstrating that the prevention of early discoloration, or in other words change in color at the very beginning of a compounding and processing operation, is a far more critical problem, and accomplished only in Example 1.

EXAMPLE 2

Polyvinyl chloride resin homopolymer compositions were prepared by hand mixing into the powdered resin the quantities of powdered or liquid materials shown in Table III below, fluxing the mixture for three minutes at 170° C. on a two-roll mill, and removing the sheets so formed. The formulation tested is representative of multi-screw extrusion formulations in containing a relatively high level of calcium stearate, while for the sake of closer observation of color differences, pigment, filler, and wax are omitted.

The ingredients of each composition are shown in Table III.

TABLE III

| Ingredient | Parts by Weight | |
|---|---|---|
| | Control G | Example 2 |
| Polyvinyl chloride resin (homopolymer) | 100 | 100 |
| Calcium stearate | 0.8 | 0.8 |
| Paraffin wax m.p. 71° C. | 1.0 | 1.0 |
| Titanium dioxide pigment | 1.0 | 1.0 |
| Calcium carbonate extender pigment | 3 | 3 |
| Methyltin tris-(isooctyl thioglycolate) | 0.2 | None |
| Dimethyltin tris-(isooctyl thioglycolate) | 0.1 | None |
| Stabilizer mixture of Example C | None | 0.3 |

Strips cut from each sheet were examined for color appearance as-milled and at successive five minute intervals, after heating for up to twenty minutes in an air-circulating oven at 190° C.

TABLE IV

| | Control G | Example 2 |
|---|---|---|
| Initial color as-milled | Faint yellow tint | White |

After minutes at 190° C.

TABLE IV-continued

| | Control G | Example 2 |
|---|---|---|
| 5 | Cream | White |
| 10 | Light amber | Light cream |
| 15 | Amber | Cream |
| 20 | Light orange | Cream |

The results demonstrate the far superior effectiveness of the stabilizer composition of Example 2 in maintaining a pure white polyvinyl chloride polymer composition when heated at 190° C.

Samples of the above Control G and Example 2 compositions were also tested for stability under dynamic shear conditions, by masticating in the bowl of a Brabender Plastograph kept at 190° C. a 75 g quantity of each milled sheet. After three minutes mastication, and subsequently at one minute intervals, small samples of the composition were removed from the mixing bowl, pressed into a dime-sized button in a hand mold, and affixed to a record card.

The Control G sample, which had a faint yellow tint as-milled and at the start of the mixing bowl experiment, had noticeably yellowed further by the time of the first sampling at three minutes of mastication.

The initially white Example 2 sample remained white for nine minutes before showing the first sign of yellowing at the ten minute sampling.

EXAMPLES 3 TO 5

A premixed blend of polyvinyl chloride resin(-homopolymer) that contained 100 parts of polyvinyl chloride (homopolymer) per 105 parts by weight of blend, white pigments, lubricants (including calcium stearate), and other unstated ingredients as supplied by a polyvinyl chloride resin manufacturer was combined with stabilizers by weighing 1 part of stabilizer for 105 parts of blend, and milling at 170° C. for three minutes to prepare a sheet. The formulation tested is believed representative of multi-screw extrusion formulations in containing a relatively high level of calcium stearate.

TABLE V

| | Control H | Ex. 3 | Ex. 4 | Ex. 5 |
|---|---|---|---|---|
| Blend as supplied without stabilizer | 105 | 105 | 105 | 105 |
| Dibutyltin monobutyltin isooctyl thioglycolate-sulfide | 1 | — | — | — |
| Stabilizer mixture of Example I | — | 1 | — | — |
| Stabilizer mixture of Example L | — | — | 1 | — |
| Stabilizer mixture of Example R | — | — | — | 1 |

The color appearance of the samples thereof as-milled and after oven ageing at 190° C. are shown in Table VI:

TABLE VI

|  | Color | | | |
|---|---|---|---|---|
| Initial color as-milled | White | White | White | White |
| After minutes at 190° C. | | | | |
| 5 | White | White | White | White |
| 10 | Faint yellow tint | White | White | White |
| 15 | Faint yellow tint | White | White | White |
| 20 | Light yellow | Faint yellow tint | White | White |
| 25 | Light yellow | Faint yellow tint | Faint yellow tint | Faint yellow tint |

The superior ability of the stabilizer compositions of Examples 3, 4 and 5 to maintain the white color of the polymer blend unchanged through the time required for extrusion processing and a generous margin of safety is demonstrated by the above test results.

Having regard to the foregoing disclosure, the following is claimed as inventive and patentable embodiments thereof:

1. A stabilizer mixture for extrudable rigid polyvinyl chloride resin compositions effective in inhibiting the development of early discoloration when the composition is heated at 375° F., comprising at least one alkyltin 2-acyloxyethylmercaptide selected from the group consisting of monoalkyltin 2-acyloxyethylmercaptides and dialkyltin 2-acyloxyethylmercaptides and mixtures thereof, and an alkyltin sulfide.

2. A stabilizer composition according to claim 1, in which the monoalkyltin 2-acyloxyethylmercaptide has the formula:

$$R_1Sn-(SCH_2CH_2OR_4)_3$$

in which:

$R_1$ is an alkyl group having from one to about twenty-six carbon atoms;

$R_4$ is H or

not more than one $R_4$ being H; and $R_2$ and $R_3$ are selected from the group consisting of hydrogen and aliphatic hydrocarbon groups having from about one to about twenty carbon atoms.

3. A stabilizer composition according to claim 1, in which the dialkyltin 2-acyloxyethylmercaptide has the formula:

$$(R_1)_2Sn-(SCH_2CH_2OR_4)_2$$

in which:

$R_1$ is an alkyl group having from one to about twenty-six carbon atoms;

$R_4$ is H or

not more than one $R_4$ being H; and $R_2$ and $R_3$ are selected from the group consisting of hydrogen and aliphatic hydrocarbon groups having from about one to about twenty carbon atoms.

4. A stabilizer composition according to claim 1, comprising a mixture of monoalkyltin and dialkyltin 2-acyloxyethylmercaptides in the proportion, expressed as tin content of the total tin present in the mixture, within the range from about 30 to about 90% monoalkyltin2-acyloxyethylmercaptide, and from about 10 to about 70% dialkyltin 2-acyloxyethylmercaptide.

5. A stabilizer composition according to claim 1, comprising a mixture of monoalkyltin and dialkyltin 2-acyloxyethylmercaptides in the proportion, expressed as tin content of the total tin present in the mixture, within the range from about 45 to about 75% monoalkyltin 2-acyloxyethylmercaptide, and from about 25 to about 55% dialkyltin 2-acyloxyethylmercaptide.

6. A stabilizer composition according to claim 1, in which the alkyltin sulfide contains one alkyl group per tin atom, linked to tin through carbon, and a sulfide sulfur group, $=S$, wherein the sulfide sulfur valences are linked to the same tin atom or to different tin atoms, the alkyl group having from one to about eight carbon atoms.

7. A stabilizer composition according to claim 1, in which the alkyltin sulfide contains two alkyl groups per tin atom, linked to tin through carbon, and a sulfide sulfur group, $=S$, wherein the sulfide sulfur valences are linked to the same tin atom or to different tin atoms, the alkyl groups having from one to about eight carbon atoms.

8. A stabilizer composition according to claim 1, wherein the alkyltin sulfide has the formula:

$$R_2SnS$$

wherein

R is an alkyl group linked to tin through carbon, and containing from one to about eight carbon atoms.

9. A stabilizer composition according to claim 1, wherein the alkyltin sulfide has the formula:

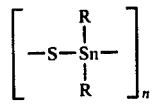

wherein

R is an alkyl group linked to tin through carbon, and containing from one to about eight carbon atoms; and n is the number of units in the chain, and ranges up to about 100.

10. A stabilizer composition according to claim 1, wherein the alkyltin sulfide has the formula:

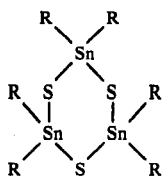

wherein
R is an alkyl group linked to tin through carbon, and containing from one to about eight carbon atoms.

11. A stabilizer composition according to claim 1, in which the alkyltin sulfide is a polymer having one or more of the formulae:

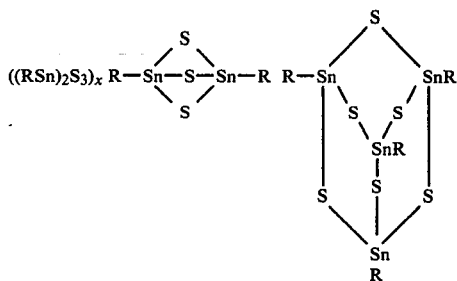

wherein
R is an alkyl group linked to tin through carbon, and containing from one to about eight carbon atoms.

12. A stabilizer composition according to claim 1, in which the alkyltin 2-acyloxyethylmercaptide is an alkyltin mercaptoethyl tallate.

13. A stabilizer composition according to claim 1, in which the organotin sulfide is dioctyltin sulfide and the organotin 2-acyloxyethylmercaptide is monooctyltin tris-(mercaptoethyl tallate).

14. A stabilizer composition according to claim 1, in which the alkyltin 2-acyloxyethylmercaptide is monobutyl tin tris-(mercaptoethyl tallate) and the alkyltin sulfide is dibutyltin sulfide.

15. A stabilizer composition according to claim 1, in which the alkyltin 2-acyloxyethylmercaptide is monobutyltin tris-(mercaptoethyl tallate) and the alkyltin sulfide is dioctyltin sulfide.

16. A stabilizer composition according to claim 1, in which the alkyltin sulfide is dibutyltin sulfide.

17. A stabilizer composition according to claim 1, in which the alkyltin sulfide is butyltin sesquisulfide.

18. A stabilizer composition according to claim 1, in which the alkyltin sulfide is dioctyltin sulfide.

19. A stabilizer composition according to claim 1, in which the alkyltin sulfide is octyltin sesquisulfide.

20. A rigid extrudable polyvinyl chloride resin composition having an enhanced resistance to early discoloration deterioration when heated at 375° F., consisting essentially of a polyvinyl chloride resin and a stabilizer composition in accordance with claim 1.

21. A rigid extrudable polyvinyl chloride resin composition in accordance with claim 20, in which the polyvinyl chloride resin is polyvinyl chloride homopolymer.

22. A rigid extrudable polyvinyl chloride resin composition in accordance with claim 20, in which the polyvinyl chloride resin is a copolymer of vinyl chloride and vinyl acetate.

23. A rigid extrudable polyvinyl chloride resin composition in accordance with claim 20, in which the amount of stabilizer composition is within the range from about 0.1% to about 5% by weight of the composition.

24. A rigid extrudable polyvinyl chloride resin composition in accordance with claim 20, including in addition a polyvalent metal salt of an aliphatic fatty acid.

25. A rigid extrudable polyvinyl chloride resin composition in accordance with claim 20, including in addition an epoxy compound.

26. A rigid extrudable polyvinyl chloride resin composition in accordance with claim 20, comprising a plasticizer in an amount up to about 10% by weight of the composition.

* * * * *